March 20, 1934. W. BERMPOHL 1,951,896
PHOTOGRAPHIC CAMERA
Filed March 13, 1930
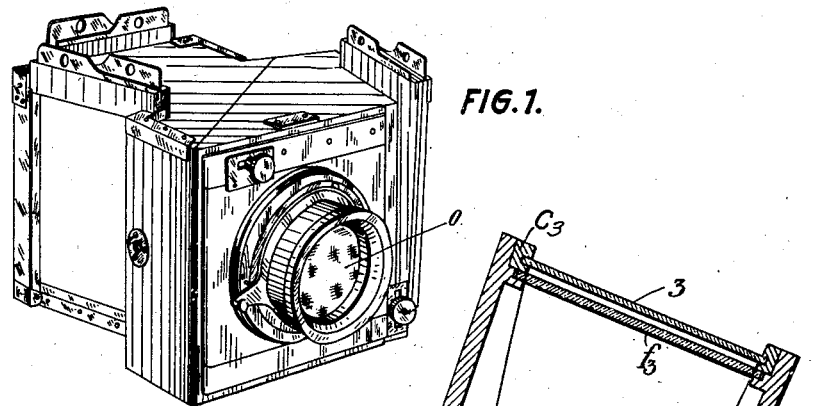
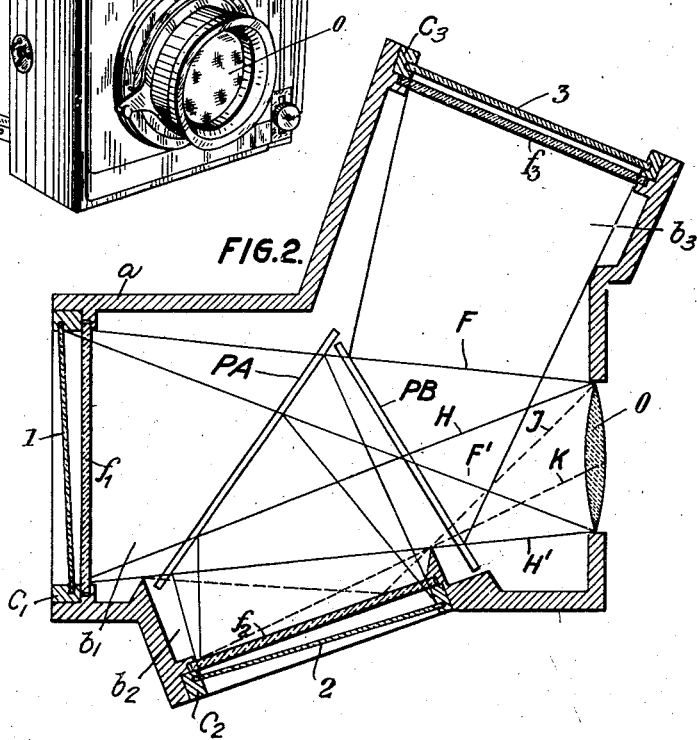
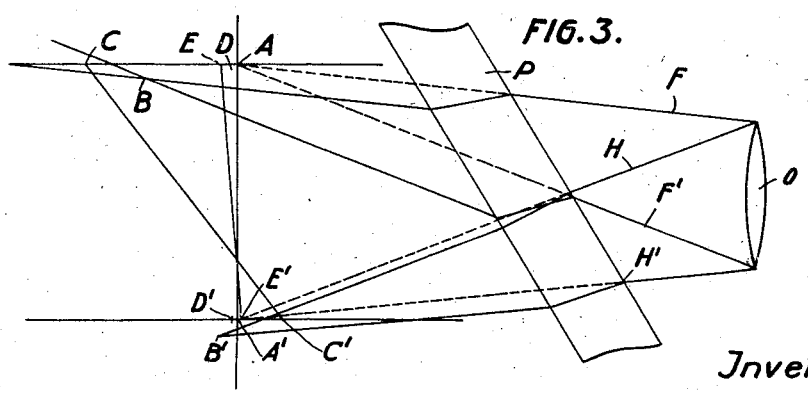
Inventor:
Wilhelm Bermpohl
By Ward Crosby + Neal
Attys.

Patented Mar. 20, 1934

1,951,896

UNITED STATES PATENT OFFICE 1,951,896

PHOTOGRAPHIC CAMERA

Wilhelm Bermpohl, Berlin, Germany

Application March 13, 1930, Serial No. 435,390
In Germany April 4, 1929

2 Claims. (Cl. 95—2)

My invention relates to photographic cameras and more particularly to an improved camera for the production of pictures in natural colours.

Cameras of this type which work on reflection or catoptric division, are mainly objectionable for the reason that it is very difficult to avoid therein all of the differences existing between the several co-operating pictures, such as distortions, dimensional variations and the like, that is to say, briefly, those defects which are generally expressed as local parallaxis or parallel displacement. In the reproduction or copying operation those pictures only can be caused to accurately register which in any and all parts thereof are of exactly like dimensions, whereas otherwise, that is, if the requirement of accurate registration is not complied with, the pictures copied in superposition will have coloured contours or similar defects.

The chief object of my invention is to provide a camera for the production of polychromatic pictures wherein the single partial pictures of the several colours of the spectrum will always have the very same size or dimensions so that all defects due to parallaxis and parallel displacement will be avoided.

With this object in view, the invention is based upon the observation and fact that a glass-plate having parallel plain surfaces and placed behind the object-glass will act to displace the image from the focal plane by an amount which depends upon the optical constants or characteristics of the said plate, that is to say, the thickness of the glass, the magnitude of the coefficient of refraction and the distance from and inclination to the pencil of rays to be deflected.

After much study and research I have found that the degree of the saliency, precision or sharpness in depth can be correlated with the degree of the displacement so as to conform thereto, provided, that care will be taken to have said degree of displacement depend upon the thickness of the parallel faced plate, the focal distance of the objective and the opening or gap of the incident pencils of rays.

I will now proceed to described my invention more in detail in connection with the embodiment thereof, illustrated somewhat diagrammatically in the accompanying drawing, it being intended and understood that the invention is illustrated by, but not limited to the embodiment thereof so illustrated and described.

In the accompanying drawing forming a part of this specification, and showing for purposes of exemplification, a preferred form and manner in which the invention may be embodied and practised, but without limiting the claimed invention to such illustrated example:

Figure 1 is a perspective view of a three-colour camera constructed according to the principles of the present invention;

Figure 2 is a view in horizontal central section of the camera shown in Figure 1 and on a somewhat larger scale and Figure 3 is a diagram showing the particular characteristics of the passage of the rays of light entering the camera.

Referring to the embodiment of the invention shown in Figs. 1 and 2 of the drawing $a$ indicates the body or casing of a trichromic camera and $o$ a lens of suitable aperture. The body contains three open pockets $b_1$, $b_2$, $b_3$ closed by dark slides $c_1$, $c_2$, $c_3$ supporting the sensitized surfaces, in other words, or generally speaking, the three panchromatic dry plates. These plates are disposed or mounted, with relation to each other, similarly to the normals respecting the sides of an obtuse-angled triangle. This disposition of the dry plates involves the particular and peculiar construction of the three-colour camera shown for purposes of exemplification. Before each sensitized surface a colored filter element $f_1$, $f_2$, $f_3$ is arranged in known manner. In the path of the rays of light entering through the lens O two inclined plates PA and PB having plain parallel surfaces are provided, as shown in Figure 2, the paths of the rays being there clearly illustrated. The two plates PA and PB are reflectors, but semi-transparent or semi-pervious to light, the plate PA causing rays of light to be deflected towards the photographic plate 2 and the plate PB causing rays to be deflected towards the photographic plate 3 while other rays fall through the plates PA and PB immediately upon the photographic plate 1, as shown by full lines in Figure 2.

In order to employ a lens with the largest possible aperture and nevertheless obtain a camera wnich is as small as possible, the sensitized plate 2 arranged in the space $b_2$ between the two semi-transparent mirrors PA and PB and the colored filter $f_2$ in front of the sensit'zed plate are inclined towards the lens $o$. The inclination is chosen so that the upper surface of the colored filter $f_2$ completely reflects all direct rays directed towards the plate 2 and which would there blur the image produced by the mirror PA and the reflected rays are absorbed on the opposite wall of the case. In Fig. 2 the outermost light rays J and K are shown in dotted lines which are prevented from reaching the sensitized plate 2 by reflection on the filter $f_2$. The reflection of these rays may be effected by any smooth surface. In the present instance the upper surface of the colored filter is employed as reflecting surface.

The diagram shown in Figure 3 illustrates, in a general manner, the production of a single or partial image. Fig. 2 shows the manner the splitting up of the light rays is corrected in passing through a plane parallel plate according to the invention. The plate P with parallel plain surfaces as shown, is of exaggerated thickness in order to more clearly illustrate the particular deflections of the rays of light, the dotted lines indicating how or that the marginal rays F and $F_1$ would intersect at A, while the marginal rays H and $H_1$ would intersect at $A_1$, if the plate P would not have been provided. Supposing however the plate P with parallel plain surfaces is positioned, for example, at an angle of 55 degrees with relation to the optical axis, so that the marginal rays F and $F_1$ will intersect at B and the marginal rays H and $H_1$ at $B_1$. Now, if B and $B_1$ would determine the position of the sensitized surface of a photographic plate, a picture would be produced which would not only be displaced and distorted with relation to the picture produced on a sensitized surface whose position had been determined by A and $A_1$, but even would also differ from the latter as regards size. The limit points for equality of size are C and $C_1$ and these limit points determine, according to the present invention, the position to be selected for the sensitized surface.

Accordingly the photographic plates of the three-colour camera shown, and, in general, all photographic plates of any camera for producing polychromatic pictures constructed in conformity with the present invention, thus are given a certain predetermined inclination which, however, is not so excessive as will appear upon inspection of the line connecting the points C and $C_1$ in Figure 3. For it is to be borne in mind that in reality the plate P is, in all and any cases, of far less thickness than shown in the diagram of Figure 3. Actually D and $D_1$ ar the geometrical loci of highest pictorial sharpness or precision, while the limit points E and $E_1$ determine the position of the sensitized surface and, therefore, the inclination of the plates supporting the said surface.

Minimal errors as regards distortion and size, it is true, cannot be avoided in connection with practical embodiments of the present invention, but in practice such errors are absolutely of no account because the sharpness in depth can readily be brought in accord therewith.

From the foregoing it is believed that the advantages and novel features of my invention will be readily understood and, therefore, further detail description is deemed unnecessary.

In reducing my invention to practice I find that the embodiment shown and described herein is the most efficient, but realizing that certain conditions will necessarily vary in concurrence with the adoption of my invention, I desire to emphasize the fact that various changes in the details of construction and in the proportion of parts may be resorted to when required, without sacrificing any of the advantages of my invention as defined in the appended claims.

What I claim is:—

1. In a photographic camera for the production of colored pictures the combination of a casing, a lens in the front wall of said casing, two inclined semitransparent light reflecting plates with parallel plane surfaces in said casing, a sensitized surface support between said plates, a further light transmitting surface arranged in front of said support at an incline to said lens adapted to completely reflect all direct rays from said lens onto the opposite wall of said casing.

2. In a photographic camera for the production of colored pictures the combination of a casing, a lens in the front wall of said casing, two inclined semitransparent light reflecting plates with parallel plane surfaces in said casing, a sensitized surface support between said plates, a colored filter arranged in front of said support at an incline to said lens adapted to completely reflect all direct rays from said lens onto the opposite wall of said casing.

WILHELM BERMPOHL.